(12) United States Patent  
Singh et al.

(10) Patent No.: US 12,301,424 B2  
(45) Date of Patent: May 13, 2025

(54) SYSTEMS AND METHODS OF VISUALIZING DATA IN A CELLULAR NETWORK

(71) Applicant: RAKUTEN MOBILE, INC., Tokyo (JP)

(72) Inventors: Abhishek Singh, San Mateo, CA (US); Anshul Bhatt, Tokyo (JP); Karan Arora, Madhya Pradesh (IN); Kunal Khanwilkar, San Mateo, CA (US); Rahul Atri, Singapore (SG); Alok Pawar, Madhya Pradesh (IN); Preetam Solanki, Madhya Pradesh (IN)

(73) Assignee: RAKUTEN MOBILE, INC., Tokyo (JP)

( * ) Notice: Subject to any disclaimer, the term of this patent is extended or adjusted under 35 U.S.C. 154(b) by 437 days.

(21) Appl. No.: 17/701,597

(22) Filed: Mar. 22, 2022

(65) Prior Publication Data

US 2023/0308355 A1   Sep. 28, 2023

(51) Int. Cl.
| | |
|---|---|
| *H04L 41/12* | (2022.01) |
| *H04L 41/08* | (2022.01) |
| *H04L 41/0816* | (2022.01) |
| *H04L 41/0859* | (2022.01) |
| *H04L 41/22* | (2022.01) |
| *H04W 16/18* | (2009.01) |

(52) U.S. Cl.
CPC .......... *H04L 41/12* (2013.01); *H04L 41/0816* (2013.01); *H04L 41/0859* (2013.01); *H04L 41/0883* (2013.01); *H04L 41/22* (2013.01); *H04W 16/18* (2013.01)

(58) Field of Classification Search
CPC . H04L 41/12; H04L 41/0816; H04L 41/0859; H04L 41/0883; H04L 41/22; H04L 41/0853; H04L 41/0863; H04W 16/18
See application file for complete search history.

(56) References Cited

U.S. PATENT DOCUMENTS

| | | | | |
|---|---|---|---|---|
| 5,894,566 | A * | 4/1999 | Croslin | H04L 43/50 703/21 |
| 6,115,743 | A * | 9/2000 | Cowan | H04L 43/0817 709/224 |
| 9,990,215 | B2 * | 6/2018 | Wong | G06F 9/45533 |
| 10,547,513 | B2 * | 1/2020 | Beyer | H04L 41/12 |
| 11,658,888 | B2 * | 5/2023 | Sinclair | H04L 41/12 709/224 |

(Continued)

*Primary Examiner* — Lisa Hashem
(74) *Attorney, Agent, or Firm* — HAUPTMAN HAM, LLP

(57) ABSTRACT

Systems and methods of visualizing data in a cellular network are disclosed. In one embodiments, a method includes presenting a network topology using a graphical user interface (GUI), wherein the network topology is a representation of at least a portion of the cellular network. A network topology selection is received related to the network topology. Additionally, parameter configuration data is generated related to the network topology selection. An audit of parameters is performed related with network elements of the cellular network in accordance with the parameter configuration data. Finally, a report of the audit is transmitted to a user device and visual representations of the report are presented using the GUI.

20 Claims, 12 Drawing Sheets

(56) References Cited

U.S. PATENT DOCUMENTS

| | | | |
|---|---|---|---|
| 11,757,721 B2* | 9/2023 | Jung | H04L 41/22 |
| | | | 709/224 |
| 11,889,407 B2* | 1/2024 | Rathore | H04W 28/0226 |
| 11,902,829 B2* | 2/2024 | Trivedi | H04W 28/0205 |
| 12,101,241 B1* | 9/2024 | Bahal | H04L 41/22 |
| 2004/0098422 A1* | 5/2004 | Levesque | H04L 67/025 |
| | | | 707/999.203 |
| 2005/0108375 A1* | 5/2005 | Hallak-Stamler | G06F 3/067 |
| | | | 709/212 |
| 2007/0208840 A1* | 9/2007 | Mcconville | H04L 41/22 |
| | | | 715/764 |
| 2010/0318652 A1* | 12/2010 | Samba | H04L 41/5009 |
| | | | 709/224 |
| 2023/0104928 A1* | 4/2023 | Gao | H04L 41/0853 |
| | | | 709/223 |

* cited by examiner

| | 500 |
|---|---|
| DOMAIN | RAN |
| SERVICE PROVIDER | SERVICE PROVIDER 1 |
| TECHNOLOGY TYPE | 4G, 5G |
| NE NAME | UHN1OSK1004OO163 |
| PARAMETER PATH | /bulkCMConfigData |
| TIME SLOTS | On - Air |

FIG. 5

| Equipment Type | Category | Parameter | X Path | Previous Date | Previous Value | Updated Date | Updated Value | W |
|---|---|---|---|---|---|---|---|---|
| MACRO_ENB | ENodeB(Through... | Description | /bulkCmConfigD... | 2021-09-09 | 442539-09 Sep 2021 17:1... | 2021-09-10 | 442539-10 Sep 2021 23:... | - |
| MACRO_ENB | ENodeB(Through... | Description | /bulkCmConfigD... | 2021-09-07 | 442539-08 Sep 2021 03:... | 2021-09-09 | 442539-09 Sep 2021 17:1... | - |
| MACRO_ENB | ENodeB(Through... | Description | /bulkCmConfigD... | 2021-09-06 | 442539-03 Sep 2021 16:1... | 2021-09-07 | 442539-08 Sep 2021 03:... | - |

Displaying 3 of 3

FIG. 7

| | | | | | |
|---|---|---|---|---|---|
| Harmony  Network Tree » UHN1OSK100400163 - Configuration Details | | | | Search | Configuration Details ▾ |

Displaying 517 or 517

| NE Name | eNodeB ID | Parameter Type | Equipment Type | Category | Parameter |
|---|---|---|---|---|---|
| UHN1OSK100400163 | 442537 | GOLDEN | MACRO_ENB | QCIProfiles(profileId=6) | Priority |
| UHN1OSK100400163 | 442537 | GOLDEN | MACRO_ENB | LTEBaseband(Through... | PLMN WhiteList |
| UHN1OSK100400163 | 442537 | GOLDEN | MACRO_ENB | QCIProfiles(profileId=7) | ROHC Enable |
| UHN1OSK100400163 | 442537 | GOLDEN | MACRO_ENB | QCIProfiles(profileId=1) | RLC Mode |
| UHN1OSK100400163 | 442537 | GOLDEN | MACRO_ENB | QCIProfiles(profileId=9) | Logical Channel UL Bu... |
| UHN1OSK100400163 | 442537 | GOLDEN | MACRO_ENB | QCIProfiles(profileId=5) | IPV1 Profile |
| UHN1OSK100400163 | 442537 | GOLDEN | MACRO_ENB | QCIProfiles(profileId=3) | ESP V1 Profile |
| UHN1OSK100400163 | 442537 | GOLDEN | MACRO_ENB | QCIProfiles(profileId=1) | RTP V2 Profile |
| UHN1OSK100400163 | 442537 | GOLDEN | MACRO_ENB | QCIProfiles(profileId=2) | Partial Handover Allo... |
| UHN1OSK100400163 | 442537 | GOLDEN | MACRO_ENB | QCIProfiles(profileId=4) | ESP V2 Profile |

Filters:
- Parameter Type / Parameter Type
- Equipment Type / Equipment Type
- Category / Category
- Parameter / Parameter
- X Path / X Path
- Current Value / Current Value
- Reset To Default / Apply Filters 800, 802

FIG. 8

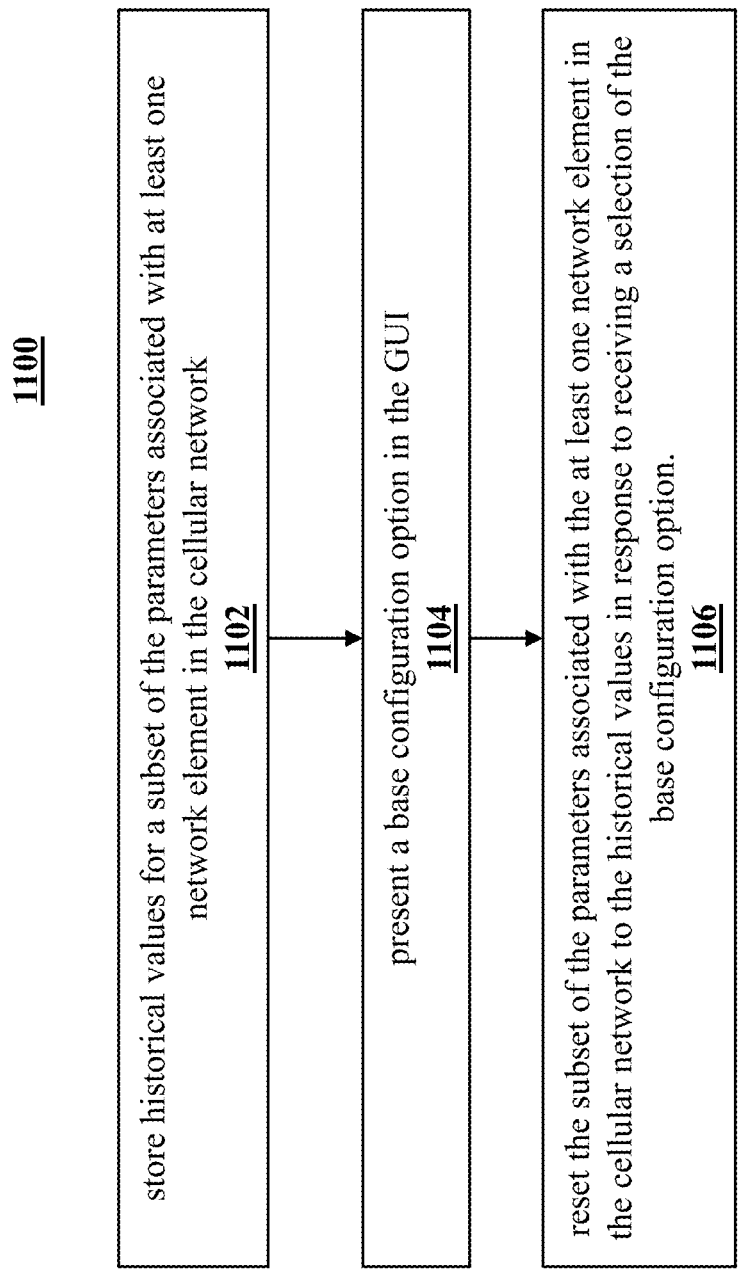

SYSTEMS AND METHODS OF VISUALIZING DATA IN A CELLULAR NETWORK

BACKGROUND

To obtain data from network elements in a cellular network, a user learns the routing and setup of the cellular network in order to route the appropriate queries and obtain the appropriate information. The user enters the routing information manually in order to find the information. The user also uses the knowledge learned about the cellular network to execute tasks in the cellular network once the data is obtained. The user manipulates the system by entering instructions manually in order to have the system perform these tasks.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 5 is a table that includes parameter configuration data that is generated in response to the network topology selection discussed above with respect to FIG. 3 and the configuration details selection in FIG. 4, in accordance with some embodiments.

FIG. 7 is a panel using the GUI that presents a configuration history for a parameter, in accordance with some embodiments.

FIG. 8 is a panel having parameter filtering options using the GUI regarding different characteristics for the parameters, in accordance with some embodiments.

FIG. 11 is a flowchart of a method of resetting parameters to historical values, in accordance with some embodiments.

DETAILED DESCRIPTION

Figure 1A:
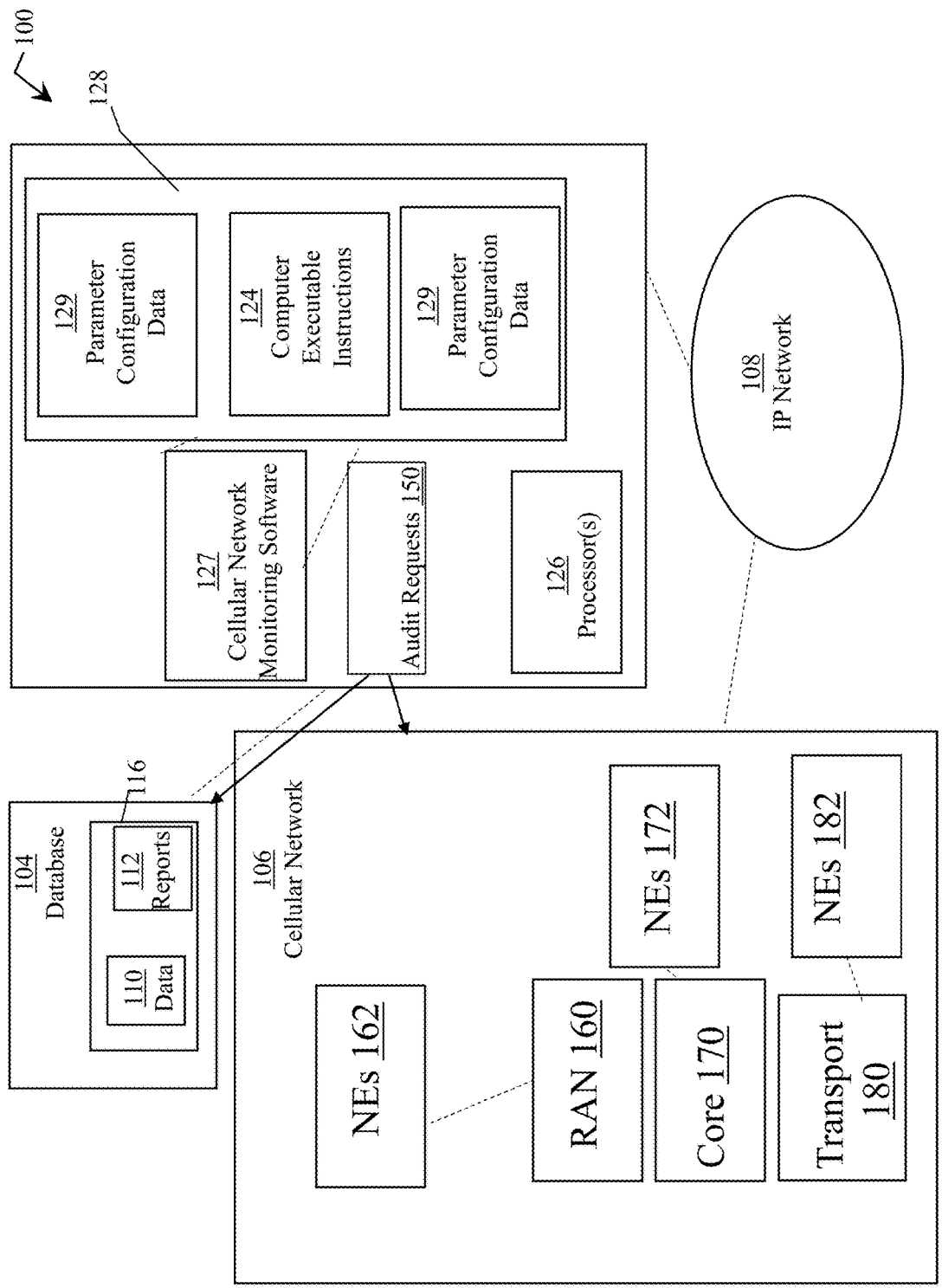
FIG. 1A is a block diagram of a computer system, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

(Optional, use when applicable) Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Systems and methods of visualizing data from a cellular network are disclosed. In some embodiments, graphical user interfaces (GUIs) are presented to allow a user to make selections regarding parameters and network elements of interest and to view the parameters. For example, the GUI presents a network topology, which is a representation of a hierarchy of components within the cellular network for at least a portion of the cellular network. In some embodiments, the network topology is hierarchical so that a user is able to make network selections in the hierarchy to select the network elements in the cellular network. Parameter configuration data is generated based on the network selections. In some embodiments, the parameter configuration data includes data for finding and obtaining the parameters related to the network elements. An audit of the parameters is performed based on the parameter configuration data and a report of the audit is generated. The report is transmitted to a user device and a visual representation of the report is presented using the GUI. In some embodiments, a user is able to take action with regards to the parameters and network elements based on the report. For example, the user selects to roll back values for the parameters to previous historical values if a network outage occurred after the parameter values are changed.

FIG. 1A is a block diagram of a computer system 100, in accordance with some embodiments.

The computer system 100 includes a cellular network monitoring device 102, at least one database 104, and a cellular network 106. Cellular network monitoring device 102 and the cellular network 106 are connected to each other through an internet protocol (IP) network 108. In some embodiments, the IP network 108 includes a wide area network (WAN) (i.e., the internet), a local area network (LAN), a wide area local area network (WLAN), and/or the like. In some embodiments, the cellular network 106 includes a wireless WAN (WWAN).

The cellular network 106 includes a radio access network (RAN) 160. The RAN 160 is the radio element of the cellular network 106. The RAN 160 includes network elements 162 such as base stations that include one or more radio transceivers. The base stations cover land areas called cells. User equipment, such as cell phones, smartphones, laptops, etc., connect to each of the base stations that cover the cells. RAN 160 connects to the core 170 through back haul links.

The core 170 is a central part of the overall cellular network 106. The core 170 allows mobile subscribers to get access to the services (e.g. international calling, text messaging, local cellular calls). In some embodiments, the core 170 is responsible for critical functions such as maintaining subscriber profile information, subscriber location, authentication of services, and the necessary switching functions for voice and data sessions. The core 170 includes network elements 172. In some embodiments, the network elements 172 include a Mobility Management Entity (MME), a Serving Gateway 166, a Multimedia Broadcast Multicast Service (MBMS) Gateway, a Broadcast Multicast Service Center (BM-SC), and a Packet Data Network (PDN) Gateway. In some embodiments, the MME is in communication with a Home Subscriber Server (HSS). The MME is the control node that processes the signaling between the user equipment and the core 170. Generally, the MME provides bearer and connection management. In some embodiments, Internet protocol (IP) packets are transferred through a serving gateway 166, which itself is connected to the IP network 108.

The transport 180 refers to the transport network that connects the core 170 and the RAN 160 of the cellular network 106. The transport 180 includes network elements 182 such as backhaul links, connectors, relays, Voice over IP devices, etc. In some embodiments, the transport 180 includes a fronthaul that connects macrocell to the small cells, radio units, digital units and/or the like. In some embodiments, the RAN 160, the core 170, and the transport 180 are referred to as different domains of the cellular network 106.

The cellular network monitoring device 102 (server 102 in some embodiments) is a computer device that includes at least one processor 126 and a non-transitory computer readable medium 128. The non-transitory computer readable medium 128 stores computer executable instructions 124. In some embodiments, non-transitory computer readable medium 128 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. When the processor 126 executes the computer executable instructions 124, the processor 126 executes the cellular network monitoring software 127.

The cellular network monitoring software 127 is configured to visualizing data 110 in the cellular network 106. The cellular network monitoring software 127 is configured to capture values of parameters from the cellular network 106 and store the parameters as the data 110 in a non-transitory computer readable medium 116 within the database 104. The parameters are captured from the NEs 162, 172, 182 in the different domains of the cellular network 106. The cellular network monitoring software 127 is configured to generate a graphical user interface (GUI) that allows a user to visualize the data 110. Accordingly, rather than having a user searching through the cellular network 106 based on personal knowledge of the cellular network 106, which is a time consuming task, the cellular network monitoring software 127 provides the capability to easily monitor the parameters from the NEs 162, 172, 182 in the different domains of the cellular network 106.

The cellular network monitoring software 127 is configured to present a network topology using the GUI. The network topology is a visual representation of at least a portion of the cellular network 106. In some embodiments, the network topology is a visual representation that generalizes the characteristics of the cellular network so the user can make selections in the network topology to select NE 162, 172, 182 that match the selected characteristics.

The cellular network monitoring software 127 is configured to receive network topology selections related to the network topology from a user device. In some embodiments, the network topology includes selections for network characteristics such as domain, vendor, service provider, and technology, geographical area, device type, and the like. In some embodiments, the network topology is hierarchical. For example, the domains of the cellular network 106 are at the top of the hierarchy in some embodiments. Once one of the domains is selected, a technology type (4G, 5G, LTE, etc.) of the cellular network 106 is selectable. Other hierarchical levels are provided under the technology type, in some embodiments.

The cellular network monitoring software 127 is configured to generate parameter configuration data 129 related to the network topology selections. In some embodiments, the parameter configuration data 129 includes a location of the parameters that are to be captured and/or obtained, the time slots for capturing and/or obtaining the parameters, the NEs 162, 172, 182 related to the parameters, routing data for finding the parameters, and the like. In some embodiments, the values captured of the parameters are stored as the data 110 since the values are historical values. In some embodiments, the values of the parameters are captured in real-time directly from the NEs 162, 172, 182. As such, in situations where the capturing is done in real-time, the parameter configuration data 129 includes routing data for capturing values for the parameters directly from the NEs 162, 172, 182.

The cellular network monitoring software 127 is configured to perform an audit related with the NEs 162, 172, 182 of the cellular network 106. In some embodiments, the cellular network monitoring software 127 transmits one or more requests 150 for parameters in accordance with the parameter configuration data 129 in order to perform the audit. In some embodiments, the requests 150 are transmitted by the cellular network monitoring software 127 to the database 104 to obtain the historical values of the parameters from the data 110. In some embodiments, the requests 150 are transmitted by the cellular network monitoring software 127 directly to specific NEs 162, 172, 182 to obtain the values of the parameters in real time. In some embodiments, the parameter configuration data 129 defines the NEs 162, 172, 182 in the cellular network 106 from which to receive the parameters. The requests 150 for the parameters are transmitted so that the parameters in the visual representations have been captured from the NEs 162, 172, 182 as defined in the parameter configuration data 129.

The cellular network monitoring software 127 is configured to generate and transmit a report 112 of the audit to the user device. The report 112 includes values of the parameters that were obtained in accordance with the parameter configuration data 129. Once the report 112 is obtained by the user device, the cellular network monitoring software 127 is configured to present a visual representation of the report using the GUI. In some embodiments, the GUI presents panels with visual representations of the parameters along with details regarding the NEs 162, 172, 182 from which the value of the parameters was captured. In some embodiments, audits are run periodically either in real time or scheduled for future time slots. In some embodiments, several other operations are provided through the GUI including changing parameter values for particular NEs 162, 172, 182, configuration change history for the NEs 162, 172, 182, configuration audit information for the NEs 162, 172, 182, layer view, and options related to roll back to base configuration.

Figure 1B:
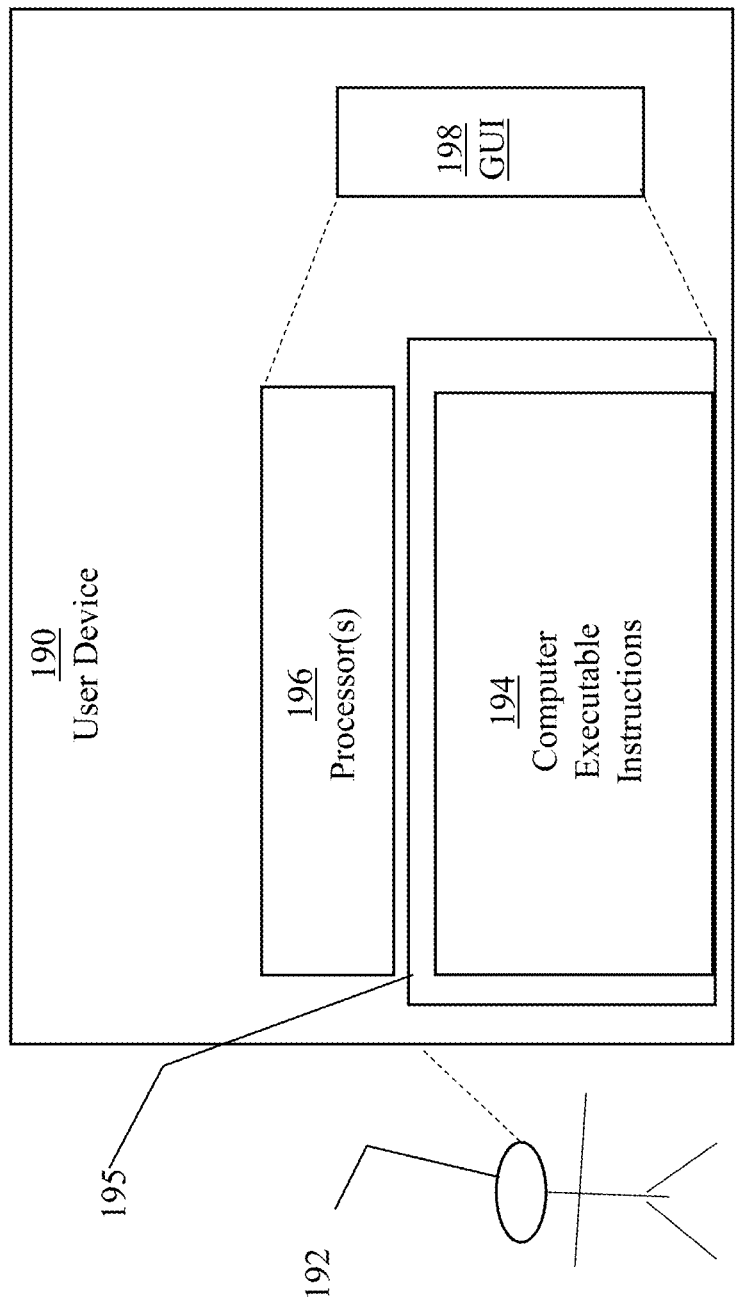
FIG. 1B is a block diagram of a user device, in accordance with some embodiments.

FIG. 1B is a block diagram of a user device 190, in accordance with some embodiments.

The user device 190 is configured to communicate with the cellular network monitoring software 127 through the IP network 108. The user device 190 includes one or more processors 196 and computer executable instructions 194 that are stored on a non-transitory computer-readable medium 195. In some embodiments, non-transitory computer-readable medium 195 include a random-access memory (RAM), a read-only memory (ROM), an electrically erasable programmable ROM (EEPROM), optical disk storage, magnetic disk storage, other magnetic storage devices, combinations of the aforementioned types of computer-readable mediums, or any other medium that can be used to store computer executable code in the form of instructions or data structures that can be accessed by a computer device. Examples of a user devices 190 include a cellular phone, a smart phone, a desktop, a session initiation protocol (SIP) phone, a laptop, a smart watch, a personal digital assistant (PDA), a satellite radio, a global positioning system, a multimedia device, a video device, a game console, a tablet, a smart device, and a wearable communication device.

When the computer executable instructions are implemented by the processors 196, the processors 196 are configured to implement a GUI 198. The GUI 198 is configured to present a network topology using the GUI 198. The network topology represents at least a portion of the cellular network 106. In some embodiments, a user 192 inputs user input through the GUI 198 to make selections related to the network topology. In some embodiments, the user 192 is selecting network elements 162, 172, 182 through the selections that the user 192 wants to audit for parameters. Additionally, in some embodiments, the GUI 198 presents parameter filtering options using the GUI 198 regarding different characteristics for the parameters. The user 192 inputs user input through the GUI 198 where the user input are selections of the parameter filtering options. Based on the selections related to the network topology and/or the selections of the parameter filtering options, the parameter configuration data is produced so that the parameters to be searched are provided in accordance with the selections of the network topology and/or in accordance with the parameter filtering option and from network elements defined in accordance with the network topology selections.

Once the audits are performed, a report 112 of the audit is transmitted to the user device 190. In some embodiments, the report 112 includes values for the parameters along with other related data. In some embodiments, the values of the parameters are obtained from the selected network elements 162, 172, 182. In some embodiments, the values of the parameters are obtained from the data 110 in the database 104. In some embodiments, the values of the parameters are obtained periodically in accordance with a defined time period. For example, the defined time period every day, every week, every month or any other type of defined time period. In some embodiments, the audit is performed in a future time so that the report includes the values of the parameters from the future time. In some embodiments, the values of the parameters in the report 122 were captured in real-time.

The GUI 198 presents a visual representation of the report. In some embodiments, the GUI 198 allows for the user 192 to provide user input related to actions related to the parameters in the report. For example, in some embodiments, the report 112 include status information related to violations related to the parameters. For example, the parameter values indicate that there is a problem in the cellular network 106. In some embodiments, the user 192 is permitted to change the parameter values through the GUI 198 in an attempt to correct the violations. In some embodiments, the GUI 198 presents options that are selectable regarding the execution of scripts or tasks that are to be performed in the cellular network 106.

Note that in some embodiments, changes to parameter values can result in problems (e.g., outages) in the cellular network 106. Accordingly, the database 104 stores historical values for the parameters as the data 110. In some embodiments, the GUI 198 presents a base configuration option using the GUI 198. In response to receiving a selection of the base configuration option through the GUI 198, the cellular network monitoring software 127 resets selected parameters associated with the one or more network elements 162, 172, 182 in the cellular network 106 to the historical values.

Figure 2:
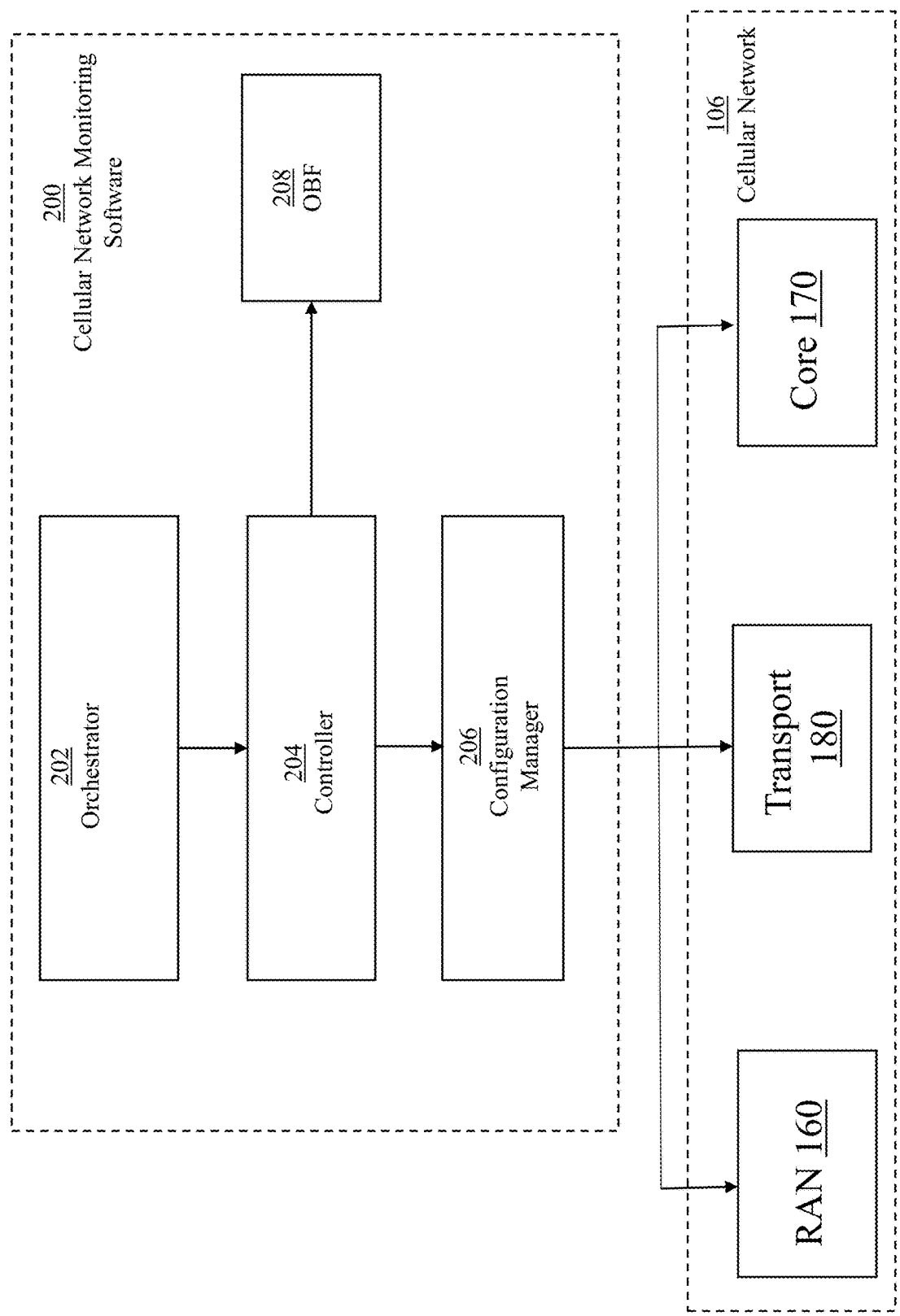
FIG. 2 is a block diagram of cellular network monitoring software and the cellular network 106, in accordance with some embodiments.

FIG. 2 is a block diagram of cellular network monitoring software 200 and the cellular network 106, in accordance with some embodiments.

The cellular network monitoring software 200 corresponds with the cellular network monitoring software 127 in FIG. 1A, in accordance with some embodiments.

The cellular network monitoring software 200 includes an orchestrator 202, a controller 204, a configuration manager 206, and an OBF 208. The orchestrator 202 is configured to automatically configure monitoring agents to communicate with cellular network 106. More specifically, the orchestrator 202 is configured to generate a push to the configuration manager 206 for generating the parameter configuration data 129 (See FIG. 1A). In some embodiments, the orchestrator 202 is configured to trigger obtaining dynamic values for parameters and providing the appropriate data to the configuration manager 206. The configuration manager 206 sends obtains the values for the parameters from the cellular network 106 or the database 104 (See FIG. 1A).

The controller 204 is configured to generate routing data for the parameter configuration data 129. The configuration manager 206 is connected to the cellular network 106 in order to transmit requests based on the parameter configuration data 129 to the RAN 160, the core 170, and the transport 180. The OBF 208 is configured to generate logs and visualizations of the parameters where the configuration manager 206 is configured to check the logs and obtain the visualizations.

In some embodiments, the configuration manager 206 is divided in two categories CMaaS and SDNC. In some embodiments, the CMaaS and the SDNC are loosely operably associated. In some embodiments, the CMaaS includes a Netconf GW, a CM Micro FE, a Backup & Restore, a Livy, a My SQL, a gRPC plugin, and a SOAP. The CM Micro FE provides entry points to the configuration manager 206 to the NEs 162, 172, 182, which are configured by configuration manager 206. The CM Micro FE is a micro front end service of CMaaS that displays the GUI and other details.

The Backup & Restore is configured to maintain backup data. The My SQL is relational to the database 104 and has persistence capabilities. The RPC Plugin is connected based on an gRPC protocol. The SOAP exchanges information with 4G EMS network devices in accordance with the gRPC protocol.

With regards to the SDNC, the SDNC includes an NBI, a transformer, a CLI plugin, a Netconf SSH, a APIC Plugin, a My SQL, a BGP-LS topology, a BGP-LS Demon, a Graph DB, and an eSON. The SDNC-NBI is an SDNC Northbound service which exposes the APIs that are consumed by other RCP Applications like CMAAS, database inventory, and the orchestrator 202. The transformer is a microservice responsible for generating the device specific configuration payload to be provisioned on the user device 190. The transformer also has device response parsing capabilities. The CLI Plugin is a microservice that provides CLI access to the network elements 162, 172, 182 via SSH. This is used in scenarios where the network elements 162, 172, 182 do not support standard API access like Netconf, Rest, or Restconf to provision configurations. The Netconf SSH is a microservice that provides the standard Netconf API access to Netconf supported devices. The APIC Plugin supports config push to Cisco ACI via a Rest interface. The MySQL provides persistence capabilities to SDNC. The BGP-LS Topology is a service that provides functionality to build BGP-LS topology and is used while generating a Path in transport slicing. The PCE is a Path computation engine that generates a path with the given slice parameters. The BGP-LS Demon registers the BGP-LS Demon as a BGP Peer in the network and collects the peer information of the entire network. The graph DB is used to store the BGP-LS topologies built by the BGP-LS Topology service. The eSON is a self-observatory network through a gRPC plugin, a smart feature, an auto learn, and an auto functionality.

Figure 3:
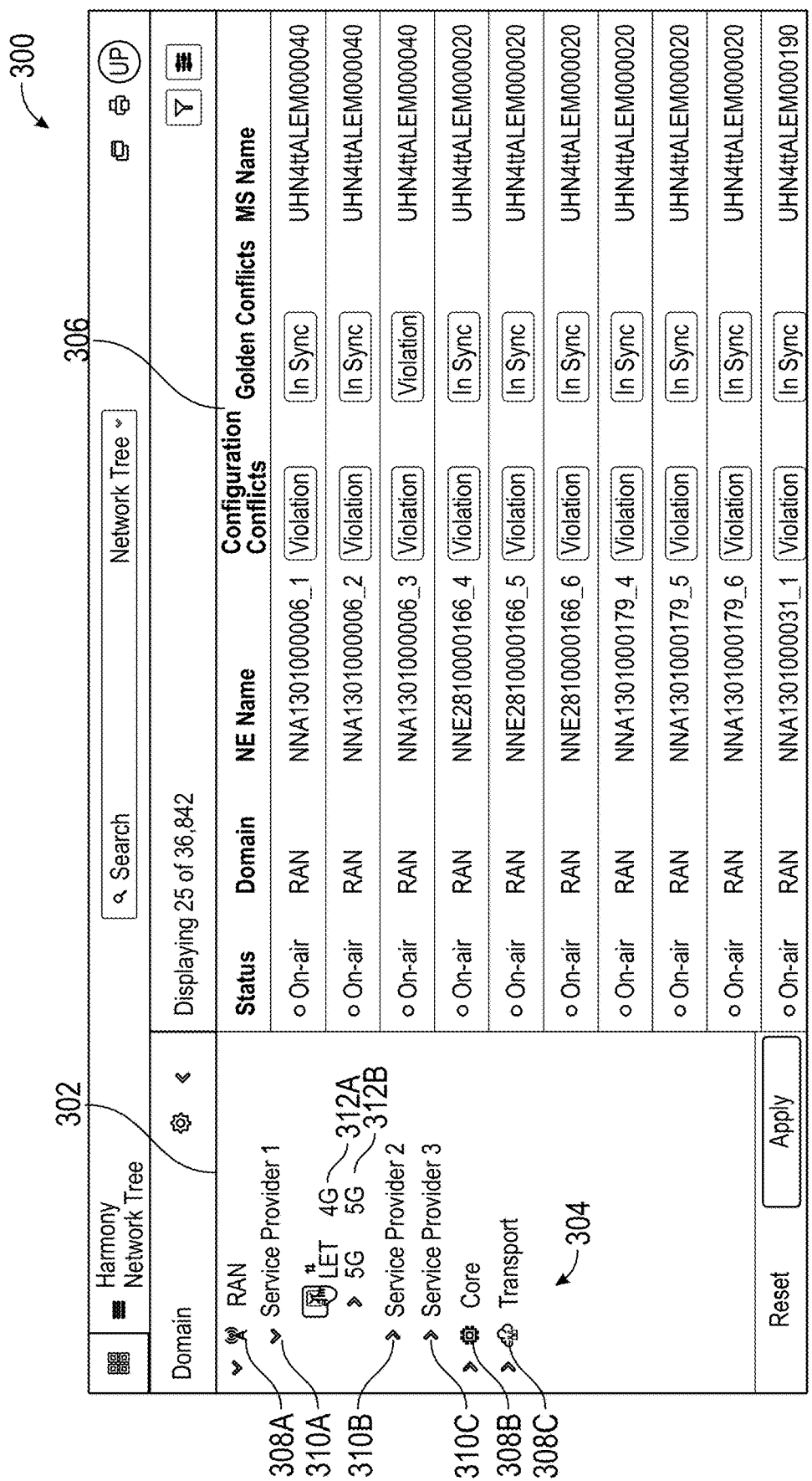
FIG. 3 is an example of a graphical user interface (GUI), in accordance with some embodiments.

FIG. 3 is an example of a GUI 300, in accordance with some embodiments.

The GUI 300 is implemented by the cellular network monitoring software 127 in FIG. 1A and the user device 190 in FIG. 1B. The GUI 300 is an example of the GUI 198 in FIG. 1B.

The GUI 300 presents a panel 302 with a network topology 304. In FIG. 3, the panel 302 with the network topology 304 is the left panel. The GUI 300 also presents a panel 306. The panel 306 presents a report of parameters and identifying information related to the selections from the network topology 304.

The network topology 304 includes domain selections 308A, 308B, 308C. The domain selection 308A allows a user to select and to view parameters and other information of the NEs 162 in the RAN 160 (See FIG. 1A and FIG. 2). The domain selection 308B allows a user to select and to view parameters and other information of the NEs 172 in the Core 170 (See FIG. 1A and FIG. 2). The domain selection 308C allows a user to select and to view parameters and other information of the NEs 182 in the transport 180 (See FIG. 1A and FIG. 2).

In FIG. 3, the domain selection 308A for the RAN 160 has been selected. As such, service provider selections 310A, 310B, 310C are presented using the GUI 300. The service provider selection 310A is to view NEs 162 (i.e., RAN NEs) related to a service provider 1. The service provider selection 310B is to view NEs 162 related to a service provider 2. The service provider selection 310C is to view NEs 162 related to a service provider 3. In FIG. 3, the service provider selection 310A has been selected. As such, parameters and other information related to the NEs 162 that are in the RAN 160 and serviced by service provider 2 are shown in the panel 306.

Under the service provider selection 310A, the network topology 304 includes technology type selections 312A, 312B. Technology type selection 312A is a selection for 4G technology. Technology type selection 312B is a selection for 5G technology. In this case, neither the technology type selection 312A nor the technology type selection 312B have been selected. Thus, parameters and other information related to the NEs 162, that are in the RAN 160, that are serviced by service provider 2, and that are either 4G technology or 5G technology are shown in the panel 306. As such the network topology 304 is hierarchical.

The panel 306 is a visual representation of a report 112. The panel 306 includes parameters and other data related to the network topology selections discussed above. The left side of the panel 306 (shown in FIG. 3) illustrates the data such as "Status," "Domain," "NE name," "Configuration Conflicts," "Golden Conflicts," "MS Name." The field "Status" indicates whether the parameter is being captured in real time (i.e., On-air), is a historical parameter value (which would include a date and time of capture), or whether the parameter is to be captured in a future time slot. The field "Domain" indicates the domain the NE from which the parameter is being captured. The field "NE name" indicates the name of the NE 162 from which the parameter is being captured. The field "Configuration Conflicts" indicates whether the parameter has a value that indicates configuration conflicts. Thus, if there are parameter values of the parameters of the NE 162 that have configuration conflicts, the field "Configuration Conflicts" has a value of "Violation." If there are no parameter values of the parameters of the NE 162 that have configuration conflicts, the field "Configuration Conflicts" has a value of "In Sync." The field "Golden Conflicts" indicates whether the parameter has a value that is out of range with regards to important system configurations. The parameters that are considered "golden parameters" are particularly important to the cellular network 106 since violations sometimes result in network outages or a poor network performance. If there are parameter values of the parameters of the NE 162 that have conflicts in golden parameters, the field "Golden Conflicts" has a value of "Violation." If there are no parameter values of the parameters of the NE 162 that have golden parameters with conflicts, the field "Golden Conflicts" has a value of "In Sync." The field "Golden Conflicts" indicates whether the parameter has a value that is out of range with regards to important system configurations. The field "MS name" indicates the name of the element management system (MS) under which the NE 162 is managed.

Figure 4:
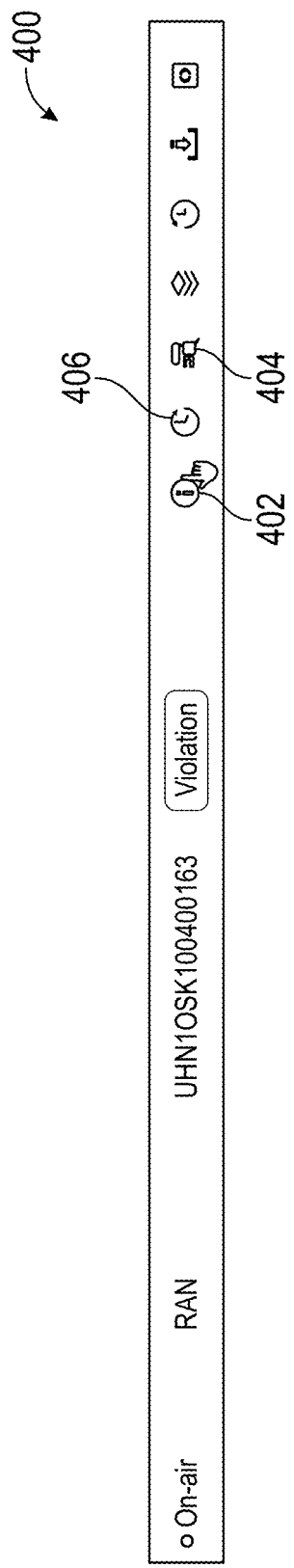
FIG. 4 is a selection screen of an MS management system from panel, in accordance with some embodiments.

FIG. 4 is a selection screen 400 of an MS management system from panel 306, in accordance with some embodiments.

As shown in FIG. 4, a configuration details selection 402 is shown by the parameter information for the MS management system. Upon selection of the configuration details selection 402, parameter configuration data is generated related to the network topology selections discussed above with respect to FIG. 3 and the configuration details selection 402 in FIG. 4. The selection screen 400 includes fields related to an NE 162 named UHN10SK100400163. The NE 162 named UHN10SK100400163 is in the RAN, is serviced by service provide 1, and either implements 4G or 5G technology.

FIG. 5 is a table that includes parameter configuration data 500 that is generated in response to network topology selections discussed above with respect to FIG. 3 and the configuration details selection 402 in FIG. 4, in accordance with some embodiments.

The parameter configuration data 500 is an example of the parameter configuration data 129 shown in FIG. 1A. Accordingly, because of the network topology selections discussed above with respect to FIG. 3, the parameter configuration data 500 includes a field named "DOMAIN", a field named "SERVICE PROVIDER", and a field named "TECHNOLOGY TYPE." In FIG. 5, the "DOMAIN" field has a value of RAN, the "SERVICE PROVIDER" field has a value of service provider 1, and the "TECHNOLOGY TYPE" has a value of 4G, 5G. Because of the configuration details selection 402 discussed above with respect to FIG. 4, the parameter configuration data 500 includes the field "NE NAME" and the field "PARAMETER PATH." In FIG. 5, the field "NE NAME" has the value UHN10SK100400163 and the field "PARAMETER PATH" has the value/bulkCMConfigData. In FIG. 5, the field "PARAMETER PATH" indicates where the parameter values can be captured or obtained either on the cellular network 106 or in the database 104.

The parameter configuration data 500 includes a field "TIME SLOTS." The field "TIME SLOTS" indicates when the parameters are to be captured. In FIG. 5, the parameter configuration data 500 indicates the value "On-Air" meaning that the parameter values for the parameters are to be captured in real-time. In some embodiments, the field "TIME SLOTS" indicates time slots in the past to obtain the historical values of the parameters from the data 110. In some embodiments, the field "TIME SLOTS" indicates future time slots from which to receive the parameters. In some embodiments, the field "TIME SLOTS" indicates that the parameters are to be captured periodically based on a defined time period (e.g. daily, weekly, monthly). An audit is performed based on the parameter configuration data 500. Requests 150 (See FIG. 1A) are generated by the cellular network monitoring software 127 based on the parameter configuration data 500. In this manner, parameters are obtained and presented in visual representations by the GUI 300 as defined in the parameter configuration data 129.

Figure 6:
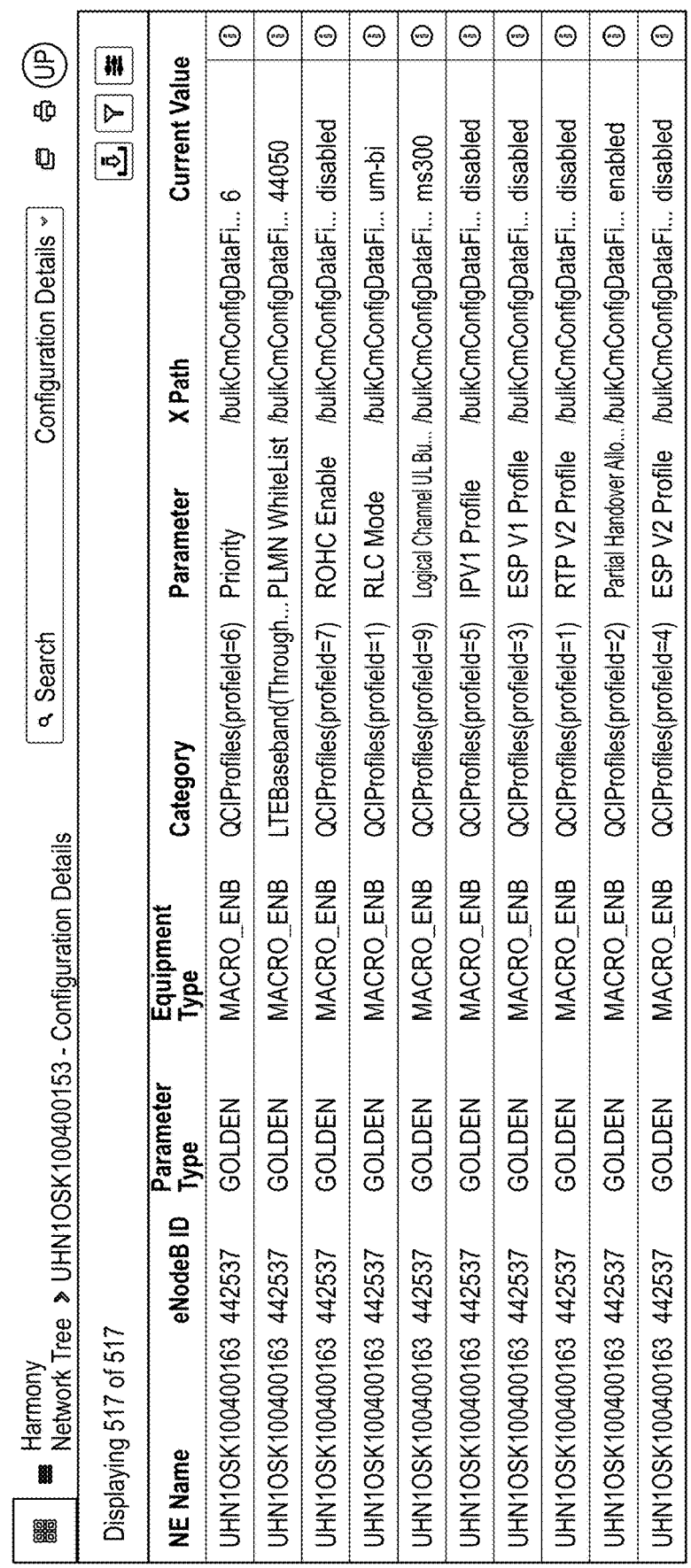
FIG. 6 is a panel using the GUI, in accordance with some embodiments.

FIG. 6 is a panel 600 using the GUI 300, in accordance with some embodiments.

The panel includes a visual representation of a report resulting from the audit. The report is an example of the report 112 in FIG. 1A. The report includes parameters for the NE named UHN10SK100400163 as a result of the parameter configuration data 500 in FIG. 5. As shown in FIG. 6, the visual representation in the panel 600 includes fields named "NE Name," "eNode B ID," "Parameter Type," "Equipment Type," "Category," "Parameter," "X Path," and "Current Value." The field named "NE Name" is the name of the NE 162 from which the parameter is captured from. The field named "eNodeB ID" identifies the name of the cell from which the parameter is captured from. The field named "Parameter Type" indicates the type of parameter (including whether the parameter is a Golden parameter). The "Equipment Type" identifies what type of equipment of the NE 162 from which the parameter was captured. The field "Category" identifies the category of the parameter that was captured. The field named "Parameter" indicates the name of the parameter that was captured. The field named "X Path" identifies the routing data for capturing the parameter. The field named "Current Value" indicates the current value of the parameter.

It should be noted that in other embodiments, the parameter configuration data 500 includes past time slots instead of requesting live data. For example, the data 110 in FIG. 1A stores historical values for a subset of the parameters associated with one or more NEs 162, 172, 182 in the cellular network 106. As such, request 150 are transmitted to the database 104 for the past captured values in the data 110 of parameters for the NE named UHN10SK100400163. Requests 150 are transmitted to the database 104 to obtain the captured parameter values in the past time slots.

It should be noted that in other embodiments, the parameter configuration data 500 includes a time period. As such, request 150 are transmitted to the database 104 for the captured values in the data 110 of parameters for the NE named UHN10SK100400163 in accordance with the time period. The resulting report is sent to the user device 190 in accordance with the time period, in accordance with some embodiments. In some embodiments, the GUI 300 presents a menu that indicates that the resulting report is ready to view. Once a user selects to view, the visual representation of the report is provided using the GUI 300.

In some embodiments, a base configuration option is presented using the GUI 300. The base configuration option is an option to reset the parameters to previous values. As such, in some embodiments, the subset of the parameters associated with the NE named UHN10SK100400163 in the cellular network 106 is reset to the historical values in response to receiving a selection of the base configuration option. Instead of a field named "Current Value," the panel 600 would include a field named "Values" that includes the historical values of the parameters.

It should be noted that in other embodiments, the parameter configuration data 500 includes future time slots instead of requesting live data or requesting live data. In some embodiments, the requests 150 are transmitted so that parameter values captured during those future time slots are obtained. As such the parameters are transmitted so that the parameters in the visual representations have been captured during the future time slots defined in the parameter configuration data 500. Instead of a field named "Current Value," the panel 600 would include a field named "Values" that includes the values of the parameters captured during the future time slots.

FIG. 4 also illustrates a configuration history selection 404.

FIG. 7 is a panel 700 using the GUI 300 that presents a configuration history for a parameter, in accordance with some embodiments.

The panel 700 appears in response to the selection of the configuration history selection 404 in FIG. 4. The panel 700 includes fields "Equipment Type," "Category," "Parameter," "X Path," "Previous Date," "Previous Value," "Updated Date," and "Updated Value." The field "Equipment Type" describes the type of equipment related to the parameter. The field "Category" describes the category of the parameter. The field "Parameter" identifies the parameter. The field "X Path" identifies the routing data for the parameter. The field "Previous Date" describes the date that a parameter was captured before the current entry. The field "Previous Date" describes the value of the parameter before the current entry. The field "Updated Value" is the value of the parameter for the current entry. The field "Updated Date" is the date the value of the parameter was captured for the current entry.

As such, the panel 700 illustrates the historical values of the parameter for one or more NEs 162, 172, 182 that are stored as part of the data 110 in the database 104. The panel 700 lists the historical values for the parameter on different dates. In some embodiments, the GUI presents a base configuration option 406 (See FIG. 4). In response to the selection of the base configuration option 406, the parameter associated with the one or more NEs 162, 172, 182 in the cellular network 106 to a historical value. In some embodiments, various parameters are reset to historical values in response to the selection of the base configuration option 406.

FIG. 8 is a panel 800 having parameter filtering options using the GUI 300 regarding different characteristics for the parameters, in accordance with some embodiments.

The user 192 (See FIG. 1B) enters selections for the parameter filtering options into the panel 800. Visual representations for the parameters selected as a result of the selections of the filtering parameter options are presented in the panel 802 in accordance with some embodiments.

The panel 800 includes parameter filtering options for "parameter type," "equipment type," "category," "parameter," "X path," and "current value." The field "parameter type" includes filtering options for different parameter types. The field "equipment type" includes filtering options for parameters related to different equipment types. The field "category" includes filtering options for parameters related to different categories of parameters. The field "parameter" includes filtering options for related to parameters. The field "X path" includes filtering options for parameters having values originating from different locations of the cellular network 106. The field "current value" includes filtering options for value ranges and/or value types of the values of the parameters.

Figure 9:
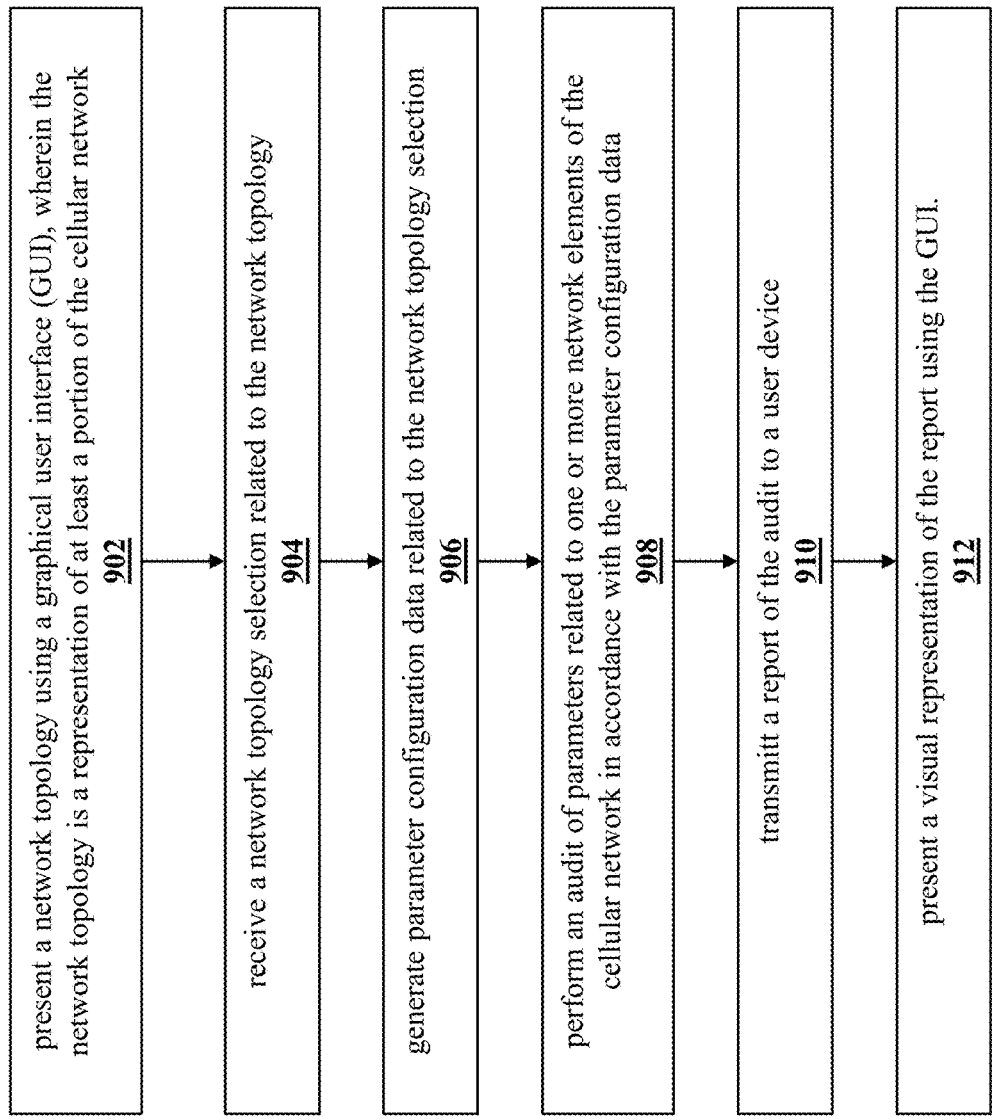
FIG. 9 is a flowchart of a method of visualizing data in a cellular network, in accordance with some embodiments.

FIG. 9 is a flowchart 900 of a method of visualizing data in a cellular network, in accordance with some embodiments.

Flowchart 900 is implemented by the computer system 100 in FIG. 1A-1B or the cellular network monitoring software 200 in FIG. 1, in accordance with some embodiments. Flowchart 900 includes blocks 902-912. Flow begins at block 902.

At block 902, a network topology is presented in a graphical user interface (GUI), wherein the network topology is a representation of at least a portion of the cellular network. An example of the GUI is GUI 300 in FIGS. 3, 4, 6, 7, 8. An example of the network topology is shown in panel 302 in FIG. 3. An example of the cellular network is cellular network 106 in FIG. 1 and FIG. 2. Flow then proceeds to block 904.

At block 904, a network topology selection is received related to the network topology. Examples of the network topology selection is the network topology selection made with respect to the domains 308A-308C, service providers 310A-310C, and technologies 312A, 312B. Flow then proceeds to block 906.

At block 906, parameter configuration data is generated related to the network topology selection. An example of parameter configuration data is parameter configuration data 129 in FIG. 1 and parameter configuration data 500 in FIG. 5. Flow then proceeds to block 908.

At block 908, an audit of parameters is performed related with network elements of the cellular network in accordance with the parameter configuration data. Flow then proceeds to block 910.

At block 910, a report is transmitted of the audit to a user device. An example of the report is shown as reports 112 in FIG. 1. Flow then proceeds to block 912.

At block 912, visual representations are presented of the report using the GUI. An example of the visual representation of the report is panel 600 in FIG. 6.

Figure 10:
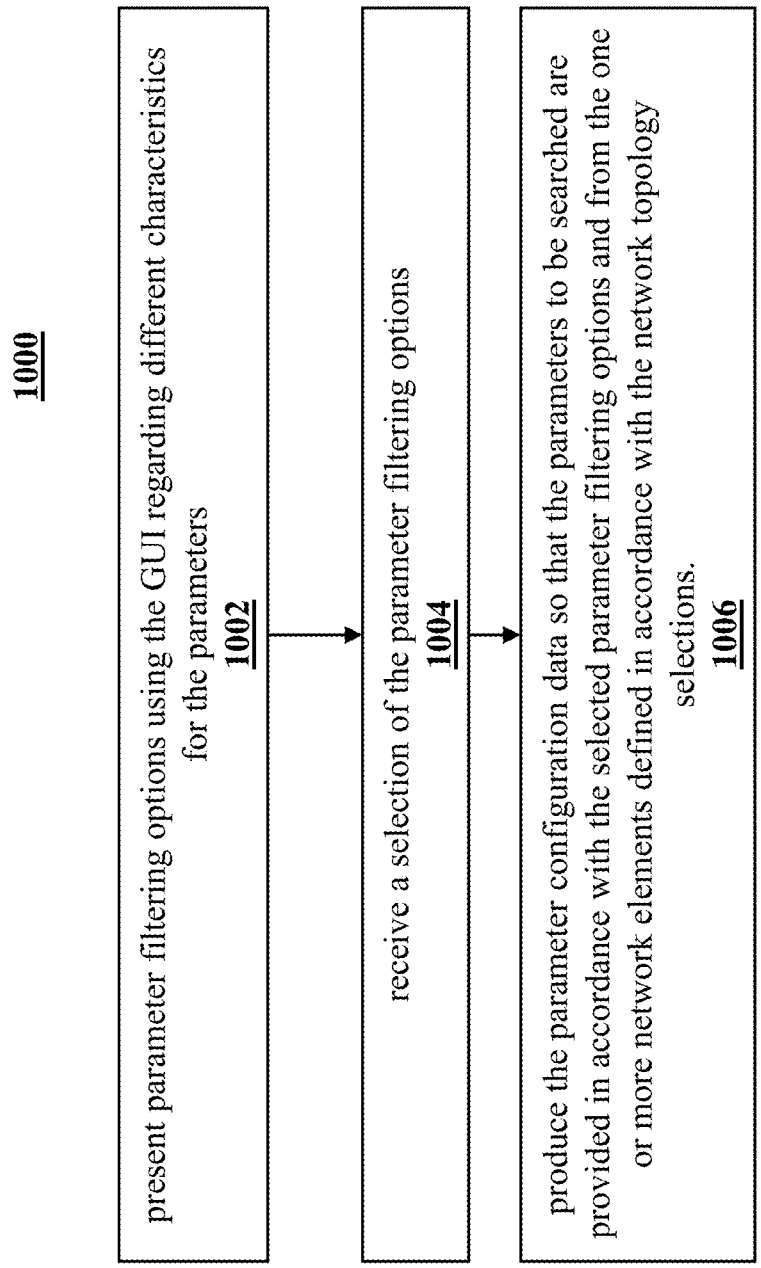
FIG. 10 is a flowchart related to a method of generating parameter configuration data related to the network topology selection, in accordance with some embodiments.

FIG. 10 is a flowchart 1000 related to a method of generating parameter configuration data related to the network topology selection, in accordance with some embodiments.

Flowchart 1000 is an example of part of block 906 n FIG. 9 in accordance with some embodiments. Flowchart 1000 includes blocks 1002-1006. Flow begins at block 1002.

At block 1002, parameter filtering options are presented using the GUI regarding different characteristics for the parameters. Parameter filtering options are shown in panel 800 in FIG. 8. The parameter filtering options in panel 800 include parameter filtering options for "parameter type," "equipment type," "category," "parameter," "X path," and "current value." Flow then proceeds to block 1004.

At block 1004, a selection is received of the parameter filtering options. Flow then proceeds to block 1006.

At block 1006, the parameter configuration data is produced so that the parameters to be searched are provided in accordance with the parameter filtering option and from network elements defined in accordance with the network topology selection.

FIG. 11 is a flowchart 1100 of a method of resetting parameters to historical values, in accordance with some embodiments.

In some embodiments, flowchart 1100 occurs after block 912 in FIG. 9. Flowchart 1100 includes blocks 1102-1106. Flow begins at block 1102.

At block 1102, historical values are stored for a subset of the parameters associated with one or more network elements in the cellular network. Examples of historical values for a subset of the parameters are shown in panel 700 in FIG. 7. Flow then proceeds to block 1104.

At block 1104, a base configuration option is presented using the GUI. An example of the base configuration option is shown as base configuration option 406 in FIG. 4. Flow then proceeds to block 1106.

At block 1106, the subset of the parameters associated with the one or more network elements in the cellular network is reset to the historical values in response to receiving a selection of the base configuration option.

In some embodiments, a method of visualizing data in a cellular network, includes: presenting a network topology using a graphical user interface (GUI), wherein the network topology is a representation of at least a portion of the cellular network; receiving a network topology selection related to the network topology; generating parameter configuration data related to the network topology selection; performing an audit of parameters related with network elements of the cellular network in accordance with the parameter configuration data; transmitting a report of the audit to a user device; and presenting a visual representation of the report using the GUI. In some embodiments, the parameter configuration data indicates that the audit is to be performed at a future time; and the audit of the parameters is performed during the future time. In some embodiments, the parameter configuration data indicates that the audit is to be performed in real-time; and the audit of the parameters is performed in real-time. In some embodiments, the parameter configuration data indicates that the audit is to be performed periodically based on a defined time period; and the audit of the parameters is performed periodically based on the defined time period. In some embodiments, the method further includes storing historical values for a subset of the parameters associated with one or more network elements in the cellular network; presenting a base configuration option using the GUI; resetting the subset of the parameters associated with the one or more network elements in the cellular network to the historical values in response to receiving a selection of the base configuration option. In some embodiments, presenting the network topology using the GUI includes presenting a domain level of the network topology that allows for selection of different domains within the cellular network. In some embodiments, presenting the network topology using the GUI includes: presenting a cellular network technology level of the network topology that allows for selection of different cellular network technologies within the cellular network. In some embodiments, generating the parameter configuration data related to the network topology selections includes: presenting parameter filtering options using the GUI regarding different characteristics for the parameters; receiving a selection of the parameter filtering options; producing the parameter configuration data so that the parameters to be searched are provided in accordance with the parameter filtering option and from network elements defined in accordance with the network topology selection.

In some embodiments, a computer device for visualizing data in a cellular network, includes: a non-transitory computer readable medium that stores computer executable instructions; at least one processor, wherein, when the at least one processor executes the computer executable instructions, the at least one processor is configured to: present a network topology using a graphical user interface (GUI), wherein the network topology is a representation of at least a portion of the cellular network; receive a network topology selection related to the network topology; generate parameter configuration data related to the network topology selection; perform an audit of parameters related with network elements of the cellular network in accordance with the parameter configuration data; transmit a report of the audit to a user device; present a visual representation of the report using the GUI. In some embodiments, the parameter configuration data indicates that the audit is to be performed at a future time; and the audit of the parameters is performed during the future time. In some embodiments, the parameter configuration data indicates that the audit is to be performed in real-time; and the audit of the parameters is performed in real-time. In some embodiments, the parameter configuration data indicates that the audit is to be performed periodically based on a defined time period; and the audit of the parameters is performed periodically based on the defined time period. In some embodiments, the processor is further configured for: storing historical values for a subset of the parameters associated with one or more network elements in the cellular network; presenting a base configuration option using the GUI; resetting the subset of the parameters associated with the one or more network elements in the cellular network to the historical values in response to receiving a selection of the base configuration option. In some embodiments, the at least one processor is configured to present the network topology using the GUI by: presenting a domain level of the network topology that allows for selection of different domains within the cellular network. In some embodiments, the at least one processor is configured to present the network topology using the GUI by: presenting a cellular network technology level of the network topology that allows for selection of different cellular network technologies within the cellular network. In some embodiments, the at least one processor is configured to generate the parameter configuration data related to the network topology selection by: presenting a parameter filtering options using the GUI regarding different characteristics for the parameters; receiving selection of the parameter filtering options; producing the parameter configuration data so that the parameters to be searched are provided in accordance with the parameter filtering option and from network elements defined in accordance with the network topology selection.

In some embodiments, a non-transitory computer readable medium that stores computer executable instructions, wherein, when at least one processor executes the computer executable instructions, the at least one processor is configured to: present a network topology using a graphical user interface (GUI), wherein the network topology is a representation of at least a portion of the cellular network; receive a network topology selection related to the network topology; generate parameter configuration data related to the network topology selection; perform an audit of parameters related with network elements of the cellular network in accordance with the parameter configuration data; transmit a report of the audit to a user device; and present a visual representation of the report using the GUI. In some embodiments, the parameter configuration data indicates that the audit is to be performed at a future time; and the audit of the parameters is performed during the future time. In some embodiments, the at least one processor is further configured to: store historical values for a subset of the parameters associated with one or more network elements in the cellular network; present a base configuration option using the GUI; reset the subset of the parameters associated with the one or more network elements in the cellular network to the historical values in response to receiving a selection of the base configuration option. In some embodiments, the at least one processor is configured to generate the parameter configuration data related to the network topology selection by: present a parameter filtering options using the GUI regarding different characteristics for the parameters; receive selections of the parameter filtering options; produce the parameter configuration data so that the parameters to be searched are provided in accordance with the parameter filtering option and from network elements defined in accordance with the network topology selection.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

What is claimed is:

1. A method of visualizing data in a cellular network, comprising:
   presenting a network topology selection panel in a graphical user interface (GUI), wherein the network topology selection panel is a visual representation of at least a portion of the cellular network and includes one or more selectable domains;
   receiving a network topology selection from the network topology selection panel, the network topology selection is made from the one or more selectable domains presented in the network topology selection panel in the GUI;

generating parameter configuration data related to the network topology selection, wherein generating the parameter configuration data related to the network topology selection comprises presenting parameter filtering options associated with different characteristics for parameters, using the GUI;

performing an audit of parameters related to one or more network elements of the cellular network in accordance with the parameter configuration data associated with the network topology selection;

transmitting a report of the audit related to the network topology selection to a user device; and presenting a visual representation of the report related to the network topology selection in the GUI.

2. The method of claim 1, wherein:
the parameter configuration data indicates that the audit is to be performed at a future time; and
the audit of the parameters is performed during the future time.

3. The method of claim 1, wherein:
the parameter configuration data indicates that the audit is to be performed in real-time; and
the audit of the parameters is performed in real-time.

4. The method of claim 1, wherein:
the parameter configuration data indicates that the audit is to be performed periodically based on a defined time period; and
the audit of the parameters is performed periodically based on the defined time period.

5. The method of claim 1, further comprising:
storing historical values for a subset of the parameters associated with at least one network element in the cellular network;
presenting a base configuration option in the GUI;
resetting the subset of the parameters associated with the at least one network element in the cellular network to the historical values in response to receiving a selection of the base configuration option.

6. The method of claim 1, wherein presenting the network topology selection panel in the GUI comprises:
presenting a domain level of network topology that allows for selection of the one or more domains within the cellular network.

7. The method of claim 1, wherein presenting the network topology selection panel in the GUI comprises:
presenting a cellular network technology level of network topology that allows for selection of different cellular network technologies within the cellular network.

8. The method of claim 1, wherein generating the parameter configuration data related to the network topology selection comprises:
receiving a selection of the parameter filtering options; and
producing the parameter configuration data so that the parameters to be searched are provided in accordance with the selected parameter filtering options and from the one or more network elements defined in accordance with the network topology selection.

9. A computer device for visualizing data in a cellular network, comprising:
a non-transitory computer readable medium that stores computer executable instructions;
at least one processor, wherein, when the at least one processor executes the computer executable instructions, the at least one processor is configured to:
present a network topology selection panel in a graphical user interface (GUI), wherein the network topology selection panel is a visual representation of at least a portion of a cellular network and includes one or more selectable domains;
receive a network topology selection from the network topology selection panel, the network topology selection is made from the one or more selectable domains presented in the network topology selection panel in the GUI;
generate parameter configuration data related to the network topology selection by presenting parameter filtering options associated with different characteristics for parameters, using the GUI;
perform an audit of parameters related to one or more network elements of the cellular network in accordance with the parameter configuration data associated with the network topology selection;
transmit a report of the audit related to the network topology selection to a user device;
present a visual representation of the report related to the network topology selection in the GUI.

10. The computer device of claim 9, wherein:
the parameter configuration data indicates that the audit is to be performed at a future time; and
the audit of the parameters is performed during the future time.

11. The computer device of claim 9, wherein:
the parameter configuration data indicates that the audit is to be performed in real-time; and
the audit of the parameters is performed in real-time.

12. The computer device of claim 9, wherein:
the parameter configuration data indicates that the audit is to be performed periodically based on a defined time period; and
the audit of the parameters is performed periodically based on the defined time period.

13. The computer device of claim 9, wherein the at least one processor is further configured to:
store historical values for a subset of the parameters associated with at least one network element in the cellular network;
present a base configuration option in the GUI;
reset the subset of the parameters associated with the at least one network element in the cellular network to the historical values in response to receiving a selection of the base configuration option.

14. The computer device of claim 9, wherein the at least one processor is configured to present the network topology selection panel in the GUI by:
presenting a domain level of network topology that allows for selection of the one or more domains within the cellular network.

15. The computer device of claim 9, wherein the at least one processor is configured to present the network topology selection panel in the GUI by:
presenting a cellular network technology level of network topology that allows for selection of different cellular network technologies within the cellular network.

16. The computer device of claim 9, wherein the at least one processor is configured to generate the parameter configuration data related to the network topology selection by:
receiving selections of the parameter filtering options;

producing the parameter configuration data so that the parameters to be searched are provided in accordance with the selected parameter filtering options and from the one or more network elements defined in accordance with the network topology selection.

17. A non-transitory computer readable medium that stores computer executable instructions wherein, when at least one processor executes the computer executable instructions, the at least one processor is configured to:
   present a network topology selection panel in a graphical user interface (GUI), wherein the network topology selection panel is a visual representation of at least a portion of a cellular network and includes one or more selectable domains;
   receive a network topology selection from the network topology selection panel, the network topology selection is made from the one or more selectable domains presented in the network topology selection panel in the GUI;
   generate parameter configuration data related to the network topology selection by presenting parameter filtering options associated with different characteristics for parameters, using the GUI;
   perform an audit of parameters related to one or more network elements of the cellular network in accordance with the parameter configuration data associated with the network topology selection;
   transmit a report of the audit related to the network topology selection to a user device; and
   present a visual representation of the report related to the network topology selection in the GUI.

18. The non-transitory computer readable medium of claim 17, wherein:
   the parameter configuration data indicates that the audit is to be performed at a future time; and
   the audit of the parameters is performed during the future time.

19. The non-transitory computer readable medium of claim 17, wherein the at least one processor is further configured to:
   store historical values for a subset of the parameters associated with at least one network element network elements in the cellular network;
   present a base configuration option in the GUI;
   reset the subset of the parameters associated with the at least one network element in the cellular network to the historical values in response to receiving a selection of the base configuration option.

20. The non-transitory computer readable medium of claim 17, wherein the at least one processor is configured to generate the parameter configuration data related to the network topology selection by:
   receive selections of the parameter filtering options;
   produce the parameter configuration data so that the parameters to be searched are provided in accordance with the selected parameter filtering options and from the one or more network elements defined in accordance with the network topology selection.

* * * * *